April 20, 1965   L. M. RICKETTS   3,178,906
FLEXIBLE SHAFT COUPLING
Filed Aug. 10, 1962
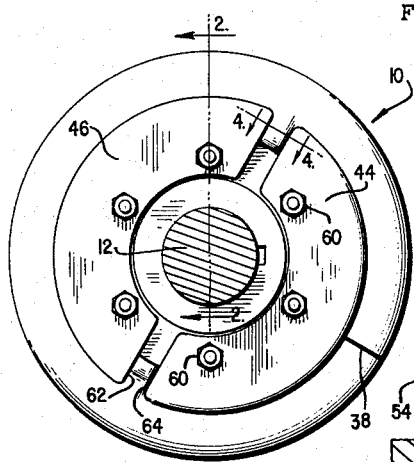
FIG. 1
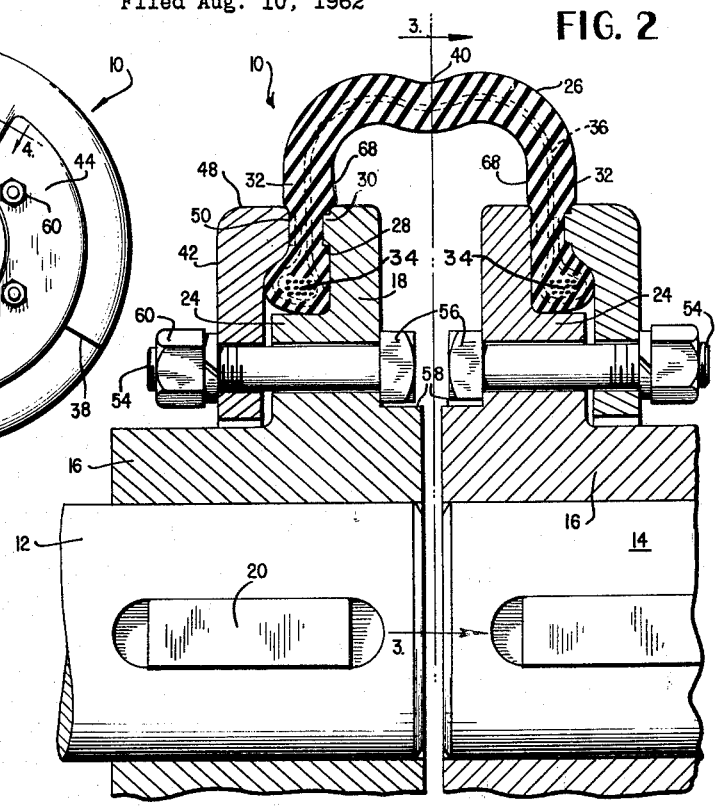
FIG. 2
FIG. 3
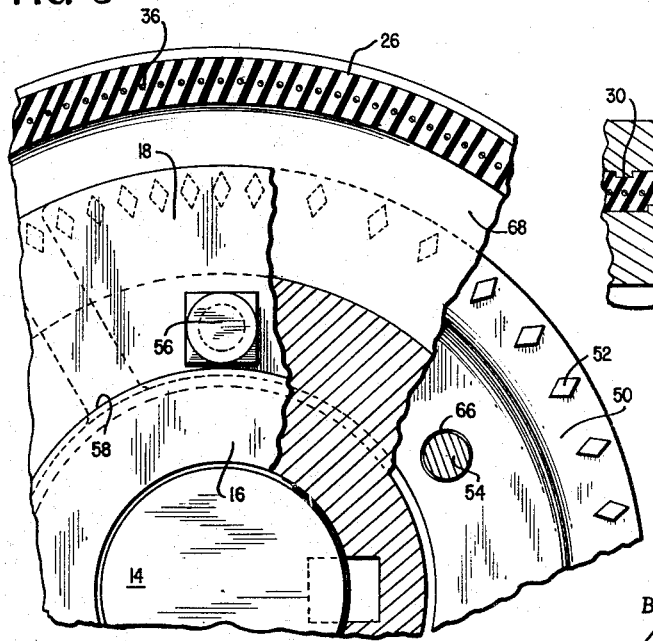
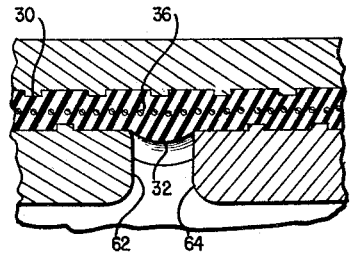
FIG. 4
INVENTOR.
LAWRENCE M. RICKETTS
BY
ATTORNEYS.

United States Patent Office 3,178,906
Patented Apr. 20, 1965

3,178,906
FLEXIBLE SHAFT COUPLING
Lawrence M. Ricketts, 4132 Roland Ave.,
Baltimore 11, Md.
Filed Aug. 10, 1962, Ser. No. 216,180
4 Claims. (Cl. 64—11)

This invention relates to flexible couplings and more particularly to flexible couplings for transmitting torque between power transmission shafts located in end-to-end relation.

The advantages of using a flexible coupling to transmit torque between power transmission shafts located in end-to-end relation has long been recognized. Chiefly, these advantages are the ability to compensate for shaft misalignment and to permit limited axial movement, or "end float" of the shafts. In addition, it is desirable for the coupling to be able to absorb vibration loads and to cushion the effect of sudden load changes or load reversals. A coupling effective in all of the above uses a flexible resilient element to transmit the torque between rigid hubs mounted on the ends of the driving and driven shafts.

In couplings of this type, difficulties have been experienced in effectively securing the flexible element to the rigid elements of the coupling to prevent radial and circumferential slippage between the flexible element and the rigid elements, and at the same time avoiding damage to the flexible element. Considerable difficulty is also involved in removing or replacing the clamping means.

It is the primary object of this invention to provide a flexible coupling having an improved clamping means which eliminates both radial and circumferential slippage between the flexible element and the rigid members of the coupling. Another object of this invention is to provide a flexible coupling having an improved clamping means which will not require excessive clamping forces to retain the flexible element against slippage.

A further object of this invention is to provide a flexible coupling which is easier to install and maintain than prior couplings of this type.

The foregoing and other objects are accomplished in a flexible coupling in which the side walls of a resilient coupling element are clamped to hubs mounted on the ends of a pair of power transmission shafts with a plurality of protrusions from the faces of the clamping elements engaging and deforming the side walls. The hub members have a radially extending flange from which projects an axially extending shoulder for engaging and positioning the inner periphery of the side walls of the flexible element, and a plurality of protrusions on the same side of the flanges as the shoulders to engage the side walls. A pair of split ring clamping elements having a clamping area defined by an axially extending portion adjacent their outer peripherby, with a plurality of protrusions formed on the clamping area, engages and clamps the other sides of the side walls against the face of the flange, with the protrusions on the flange and the clamping surfaces deforming the side walls.

Other objects and advantages of this invention will become apparent by reference to the following specification taken in conjunction with the accompanying drawings, in which FIG. 1 is a side elevational view of a flexible coupling embodying the present invention;

FIG. 2 is a partial cross-sectional view taken on line 2—2 of FIG. 1;

FIG. 3 is a fragmentary sectional view taken on line 3—3 of FIG. 2; and

FIG. 4 is a fragmentary sectional view taken on line 4—4 of FIG. 1.

Referring now to the drawings, a coupling embodying the invention, designated generally by numeral 10, is shown mounted on a pair of axially aligned power transmission shafts 12, 14. Since the coupling is symmetrical about a plane midway between and perpendicular to the longitudinal axis of the shafts, only one half of the coupling will be described in detail. Hub member 16 having a radially extending flange 18 is mounted, as by key 20, on the end of shaft 12. Flange 18 has an axially extending shoulder 24 formed thereon for engaging and radially positioning the resilient torque transmitting element 26. Circumferentially spaced around the face 28 of flange 18 adjacent the periphery thereof is a plurality of integrally formed, generally diamond-shaped protrusions 30.

Referring to FIGS. 1 and 2, the resilient torque transmitting element 26 is substantially annular and generally U-shaped in cross section, having the general shape and appearance of a vehicle tire. Side wall 32 is formed with a reinforced rim 34 adjacent the inner periphery, and the body portion is reinforced with a plurality of cord element 36. To facilitate installation, flexible element 26 is split, as at 38, so that it may be easily deformed for installation over the flanges after the hubs have been mounted on the shafts. After installation, the split 38 is substantially closed so that the flexible element 26 is substantially continuous circumferentially. Preferably, flexible element 26 is formed with a reduced diameter near its central section, as shown at 40, to increase the flexibility of the coupling.

Mounted on hub 16 is a split ring clamping element 42 comprising a pair of substantially semicircular halves 44, 46, having an axially extending portion 48, adjacent its outer periphery defining a clamping surface 50. A plurality of integrally formed, generally diamond-shaped protrusions 52 are spaced around surface 50. Protrusions 30 and 52 are radially equally spaced from the center of coupling 10, but are circumferentially offset, as best seen in FIG. 4, so that successive protrusions 52 are approximately equidistant between successive protrusions 30. Clamping element 42 is circumferentially positioned and retained by clamping bolts 54 extending through axially aligned holes 66 in shoulders 24 and clamping element 42.

Clamping bolts 54 are provided with square heads 56 which are positioned in such close proximity to shoulder 58 on hub 16 as to prevent bolt 54 from turning when nuts 60 are installed or removed.

While clamping elements 44, 46 are substantially semicircular, preferably, when installed, their ends 62, 64 are slightly separated as shown in FIG. 4 so that side wall 32 of flexible element 26 is slightly extruded therebetween, thereby increasing the resistance of the flexible element to radial slippage.

To install this coupling, hubs 16 are mounted on shafts 12 and bolts 54 are inserted in holes 66 of flanges 18. Shafts 12, 14 are then positioned in end-to-end relation and flexible element 26 is placed around hubs 16 so that the inner surface 68 of side walls 32 are adjacent faces 28 of flanges 18 and rims 34 engage shoulders 24. Clamping elements 42, 44 are then positioned over bolts 54, and nuts 60 are tightened to clamp side walls 32 of the flexible element 26 between flanges 18 and clamping surface 50 of elements 42, 44. As side wall 32 is compressed, protrusions 30, 52 will deform the side wall, causing it to assume a generally zig-zag shape. This deformation of the side wall offers excellent resistance to both radial and circumferential slippage, thereby eliminating the necessity for excessive clamping force to retain the flexible element. The use of a split ring clamping element makes it possible to remove or replace the clamping elements without the necessity of moving the shafts and removing the hubs therefrom.

While I have described one embodiment of my invention, it will be apparent that the disclosed embodiment may be modified. Therefore, the foregoing description is to be considered exemplary rather than limiting and the true scope of my invention is that defined in the following claims.

What is claimed is:

1. A flexible coupling for transmitting torque between two shafts in end-to-end relation comprising hub members mounted on the respective ends of the shafts, each of said hub members having a radially disposed flange from which projects a shoulder substantially axially aligned on the two hub members, a plurality of protrusions on the same side of the flanges as the respective shoulders, a hollow annular torsion member of resilient material having an open inner periphery with the inner ends of the side walls resting on said shoulders and one face of each side wall engaging the protrusions on the respective flanges, a pair of substantially semicircular clamping members engaging the other face of each side wall of the torsion member with adjacent ends of each pair of clamping members spaced circumferentially from one another, and bolt means compressing the side wall between said clamping member and said flanges and the protrusions thereon and extruding said side walls between said adjacent ends of said clamping members.

2. A flexible coupling for a transmitting torque between two shafts in end to end relation comprising hub members mounted on respective ends of the shafts, each of said hub members having a radially disposed flange from which projects a shoulder substantially axially aligned on the two hub members, a plurality of protrusions on the same side of the flanges as the respective shoulders, a hollow annular torsion member of resilient material having an open inner periphery with the inner ends of the side walls resting on said shoulder and one face of each side wall engaging the protrusions of the respective flanges, a plurality of segmental substantially arcuate shaped clamping members engaging the other face of each side wall of the torsion member with adjacent ends of said arcuate clamping members being circumferentially spaced from one another, and bolt means compressing the side wall between said clamping members and said flanges and the protrusions thereon and extruding said side walls between said adjacent ends of said clamping members.

3. A flexible coupling for transmitting torque between two shafts in end to end relation comprising hub members mounted on the respective ends of the shafts, each of said hub members having a radially disposed flange from which projects a shoulder substantially axially aligned on the two hub members, a plurality of protrusions on the same side of the flanges as the respective shoulders, a hollow annular torsion member of resilient material having an open inner periphery with the inner ends of said side walls resting on said shoulders and one face of each side wall engaging the protrusions on the respective flanges, clamping means having a radially disposed annular clamping surface with a plurality of protrusions thereon, said protrusions on said clamping surface being spaced from the inner and outer peripheral edges of said annular clamping surface and being radially equally spaced as the protrusions on said flange and circumferentially offset therefrom, and bolt means extending thru said clamping members and said shoulders compressing the side walls between said flanges and the protrusions thereon and said clamping means and the protrusions thereon.

4. The flexible shaft coupling as defined in claim 3 wherein the protrusions on said flanges and the protrusions on said clamping surface are of generally rectangular cross-section in a plane perpendicular to the axes of said coupling.

References Cited by the Examiner
UNITED STATES PATENTS

| 1,107,315 | 8/14 | Krebs | 64—13 |
| 1,483,561 | 2/24 | Ungar | 64—12 |
| 1,664,052 | 3/28 | Ungar | 64—13 |
| 2,328,614 | 9/43 | Busse | 64—11 X |
| 2,648,958 | 8/53 | Schlotmann | 64—13 |
| 3,068,665 | 12/62 | Firth | 64—11 |

FRANK SUSKO, *Primary Examiner.*

KARL J. ALBRECHT, ROBERT C. RIORDON,
*Examiners.*